Figure 1:
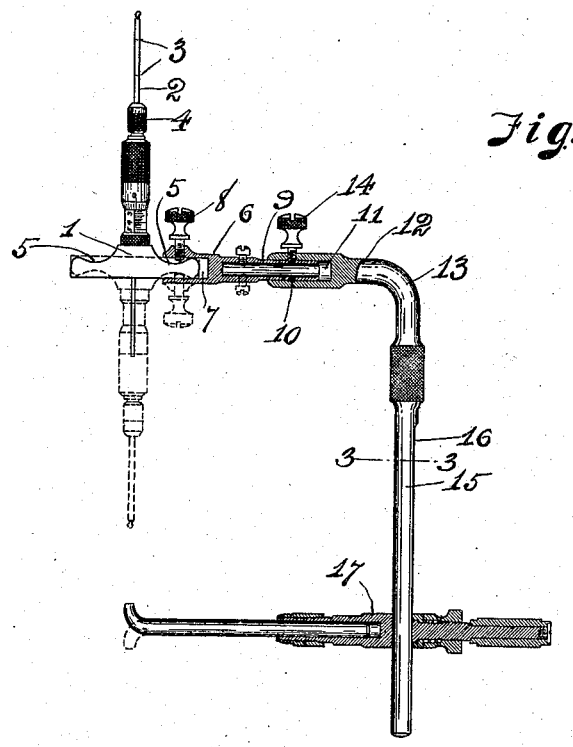
Figure 3:
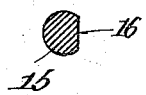
Figure 2:
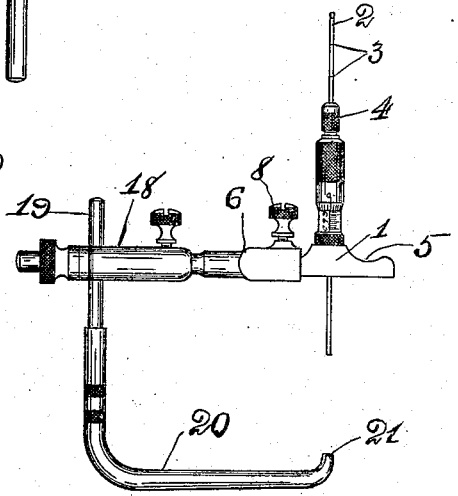

H. SPAHN.
MICROMETER.
APPLICATION FILED DEC. 19, 1908.

939,562.

Patented Nov. 9, 1909.

Witnesses.

Inventor.
Henry Spahn
By Rudolph Jr.
Attorney.

UNITED STATES PATENT OFFICE.

HENRY SPAHN, OF CHICAGO, ILLINOIS.

MICROMETER.

939,562.  Specification of Letters Patent.  Patented Nov. 9, 1909.

Application filed December 19, 1908. Serial No. 468,409.

*To all whom it may concern:*

Be it known that I, HENRY SPAHN, citizen of the United States, residing at Chicago, in the county of Cook and State of Illinois, have invented certain new and useful Improvements in Micrometers; and I do hereby declare the following to be a full, clear, and exact description of the invention, such as will enable others skilled in the art to which it appertains to make and use the same.

This invention relates to a novel construction in a micrometer and has for its object to provide means whereby a depth gage of any well-known pattern may be converted into a micrometer adapted for all outside measurements of bodies which are within certain limits and also the inner dimensions of all openings and recesses, and consists in the features of construction and combinations of parts hereinafter fully described and claimed.

In the accompanying drawings illustrating my invention: Figure —1— is a view in side elevation and partly in section of a micrometer constructed in accordance with my invention. Fig. —2— is a view in side elevation of a modified form of construction of the same. Fig. —3— is a detail section on the line 3—3 of Fig. —1—.

At the present time the machinist is obliged to provide himself with quite a large variety of sizes and styles of micrometers in order to enable him to measure various diameters and thicknesses of bodies, various sizes of openings, and various depths of recesses. For example, one micrometer will measure up to one inch diameter, another from one inch to two inches, and so on. The same is true of inside micrometers. The depth gage covers a wider range of measurements. These instruments are very expensive and a complete set necessitates a large investment.

The object of my present invention is to provide an instrument, or rather an attachment to a depth gage whereby the latter may be easily converted into a micrometer for measuring either small or large diameters or thicknesses up to certain maximum dimensions and inside diameters or dimensions of openings between certain maximum and minimum limits, thereby obviating the necessity of purchasing a large number of instruments to cover a certain range of dimensions.

The depth-gage is well-known and consists of a base or foot —1— having a plane lower face. The gage rod —2— passes centrally through the base —1— and is disposed perpendicularly to the plane lower face thereof. The said rod —2— is provided at intervals of one-half inch with annular grooves —3— engaged in a well-known manner to hold said rod against longitudinal movement relatively to the engaging member. The latter has threaded engagement with a hollow cylindrical standard disposed on the center of the upper face of the base or foot —1— and serves when turned to impart movement to said rod relatively to the latter. A nut —4— controls the engaging relation between said rod and the engaging member and when turned in one direction permits the rod to be moved longitudinally relatively thereto.

I have illustrated the Brown and Sharpe depth gage and the above description refers particularly to this type which is probably most generally used.

In the upper face of the base or foot —1— on either side of the middle portion thereof is a recess —5—.

My attachment comprises a member —6— provided in one end with a rectangular recess —7— in which one end of the base or foot —1— is received, the latter being secured by means of the set-screws —8— entering the recess —5— therein. At its other end the said member —6— terminates in a cylindrical shank —9— provided at diametrically opposite points with conical recesses —10—. The shank —9— enters the cylindrical recess —11— in the arm —12— of a member —13— and is secured therein by means of a set-screw —14— having a conical end entering one of said recesses —10— and serving to secure said members —6— and —13— against relative movement in all directions.

The arm —15— of the member —13— is disposed perpendicularly to the arm —12— thereof and its free end portion is cylindrical, a portion thereof being cut away to provide a flat face —16— extending almost the entire length of the said free end portion.

The position of the recesses —10— relatively to the walls of the recess —7— and the position of the set-screw —14— relatively to the arms of the member —13— is such that they coact with each other to maintain the said arms of said member —13— and the rod —2— of the depth gage in a common plane.

On the arm —15— of the member —13— a trammel point —17— is longitudinally movable, the latter being of the Brown & Sharpe or any other well-known type. The flat face —16— of the arm —15— serves to maintain the trammel point in the plane of the member —13— and the rod —2—.

When assembled as shown in full lines in Fig. —1— the instrument may be used to measure the diameter of shafts, etc., or the thickness of a body from the smallest dimension up to the maximum distance attainable between the end of the rod —2— and the free end or point of the trammel point. Primarily the trammel point —17— must be adjusted to a given position on the arm —15—. To accomplish this the rotating member engaging the rod —2— is turned to register O on the depth gage scale. Then said rod —2— is moved longitudinally a distance exceeding the diameter or thickness to be measured and so that an annular recess —3— thereof is engaged. Then the trammel point is moved until the free end or point thereof is in contact with the end of the rod —2— and is there secured. The rod —2— is then moved back so that the distance between the end thereof and the point of the trammel is greater than the diameter or thickness to be measured and always of course so that one of the annular grooves therein is engaged. By then turning the engaging member the said rod —2— is moved until the distance between the opposing points accords with the diameter or thickness of the interposed body. The distance which the rod —2— was projected below the lower face of base or foot —1— to primarily adjust the position of the trammel point, less one-half inch (allowed for travel of the rod —2—) constitutes the basic measurement to which is added the fractional part of a half inch registered on the depth gage scale after final adjustment of the rod —2— and trammel point to confine the interposed body therebetween. In other words, if a shaft measuring between two and two and one-half inches is to be measured, the rod —2— is projected two and one-half inches below the plane face of the base or foot —1—. Then the trammel point is adjusted to contact therewith and the rod then returned to its original position, thus leaving the distance between opposing points two and one-half inches. The rod —2— is then projected by revolving the engaging member until the distance between opposing points equals the diameter of the shaft. By then reading on the graduated scale on the standard, the fractional part of the inch is read and this added to two inches is the diameter of the shaft.

By turning the trammel point and the depth gage each one-hundred-eighty degrees as shown in dotted lines in Fig. —1— the device may be used to measure large inside dimensions as of openings or recesses.

By removing the member —6— from engagement with the base or foot —1— the depth gage is used independently.

The use of the device for measuring the dimensions of openings is relatively very limited.

In Fig. —2— I have illustrated a modified form of construction in which an extension member —18— is mounted upon the free end portion of the member —6—, the said member —18— having a transverse opening therein for the passage of the shank —19— of an anvil —20—, said shank —19— being provided with a flat face similarly to the arm —15— of the member —13— and for the same purpose. The point —21— of the anvil opposes the rod —2— and coacts with the latter to measure diameters and thicknesses, but is not adapted for the measurement of openings or recesses.

My said device enables accurate measurements to be made and serves to obviate the use of a large number and variety of micrometers and attachments therefor.

I claim as my invention:

1. The combination with a depth-gage of a jointed L-shaped member removably secured at the free end of one arm to the base of said gage, said arm being separable between its ends and the parts thereof pivotally movable with relation to each other, means for holding said parts against relative movement, the other arm of said member being adapted to be held parallel with the rod of said depth gage, and a trammel point slidable on said last-named arm and having its free end disposed in axial alinement with said rod.

2. The combination with a depth-gage of a jointed L-shaped member removably secured at the free end of one arm to the base of said gage, said arm being separable between its ends and the parts thereof pivotally movable with relation to each other, means for holding said parts against relative movement, the other arm of said jointed member being adapted to be held parallel with the rod of said depth gage, a member slidable on said last-named arm, and a point member removably and adjustably mounted in said last named member and adapted to be adjusted thereon to bring the free end thereof into axial alinement with said rod.

3. The combination with a depth gage, of a jointed member removably secured to the base thereof, the parts of said jointed member being separable and rotatable relatively to each other, and a member adjustably engaged with said jointed member and having a point-portion disposed parallel with the axis of said jointed member, said last-named member being movable toward and away from said jointed member, the free end of said point-portion being adapted to be disposed in axial alinement with the rod of said depth-gage.

In testimony whereof I have signed my name in the presence of two subscribing witnesses.

HENRY SPAHN.

Witnesses:
W. W. JOHNSON,
A. FRANK PHILEPEAU.